US009672184B1

(12) United States Patent
Jain et al.

(10) Patent No.: US 9,672,184 B1
(45) Date of Patent: *Jun. 6, 2017

(54) METHODS AND SYSTEMS FOR RAPID CONFIGURATION, CALIBRATION, AND DEPLOYMENT OF A MODULAR ROBOT WORKCELL

(71) Applicant: REDWOOD ROBOTICS, INC., San Francisco, CA (US)

(72) Inventors: Advait Jain, San Francisco, CA (US); Aaron Edsinger, San Francisco, CA (US); Anthony Jules, Oakland, CA (US); Stefan Nusser, Palo Alto, CA (US); James Nicholas Vines, San Francisco, CA (US)

(73) Assignee: Redwood Robotics, Inc., San Francisco, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/308,800

(22) Filed: Jun. 19, 2014

Related U.S. Application Data

(60) Provisional application No. 61/838,700, filed on Jun. 24, 2013.

(51) Int. Cl.
*G06F 3/00* (2006.01)
*G06F 13/24* (2006.01)
*G06F 13/40* (2006.01)
*G06F 21/00* (2013.01)

(52) U.S. Cl.
CPC .......... *G06F 13/409* (2013.01); *G06F 13/24* (2013.01); *G06F 21/00* (2013.01)

(58) Field of Classification Search
CPC .......... G06F 3/011; G06F 13/24; G09B 21/00
USPC .................... 710/260, 8, 12, 15, 18
See application file for complete search history.

(56) References Cited

U.S. PATENT DOCUMENTS

| | | | |
|---|---|---|---|
| 5,495,410 A * | 2/1996 | Graf ...................... | B25J 9/1671 318/568.11 |
| 6,070,109 A * | 5/2000 | McGee ................. | B25J 9/1692 700/254 |
| 6,822,412 B1 * | 11/2004 | Gan ...................... | B25J 9/1692 318/568.11 |
| 2005/0075757 A1* | 4/2005 | Haas .................. | G01N 35/0092 700/245 |

(Continued)

*Primary Examiner* — Idriss N Alrobaye
*Assistant Examiner* — Getente A Yimer
(74) *Attorney, Agent, or Firm* — McDonnell Boehnen Hulbert & Berghoff LLP

(57) ABSTRACT

A method operable by a computing device is provided. The method may include receiving a request for a given task to be performed by a modular reconfigurable workcell. The method may also include determining one or more peripherals required to perform the given task. The method may also include determining an optimal placement of the one or more peripherals based on the given task, wherein the one or more peripherals are coupled to the workcell in a fixed geometric configuration based on the determined optimal placement. The method may also include determining a first calibration of the one or more peripherals based on the orientation of the one or more peripherals relative to the workcell, and determining a second calibration of the one or more peripherals based on the optimal placement of the one or more peripherals with respect to each other.

20 Claims, 17 Drawing Sheets

(56) References Cited

U.S. PATENT DOCUMENTS

2012/0123590 A1* 5/2012 Halsmer ................ B25J 9/1656
　　　　　　　　　　　　　　　　　　　　　　700/264

* cited by examiner

METHODS AND SYSTEMS FOR RAPID CONFIGURATION, CALIBRATION, AND DEPLOYMENT OF A MODULAR ROBOT WORKCELL

CROSS-REFERENCE TO RELATED APPLICATION

The present application claims priority to U.S. Patent Application Ser. No. 61/838,700, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

A workcell provides a mounting structure to attach robot peripherals, such as sensors, actuators, arms, computers, and power supplies. Usually, a technician integrates these peripherals to create a custom workcell solution to solve a specific task. This integration effort includes mechanically installing robot peripherals into the workcell, wiring these devices together, describing their configuration within an automation controller, and then calibrating a geometric location of these devices relative to each other and to the world.

This integration process can be time consuming and expensive. If it is desired to modify the workcell functionality, much of this integration effort is repeated. In addition, workcells often may not be able to be reconfigured since the workcells are usually customized for a specific task or requirement. A high cost of modification may also make it undesirable to swap out older or damaged devices.

SUMMARY

In one example, a method operable by a computing device is provided. The method may include determining a location and an orientation of a first docking module from among a plurality of modular docking bays on a surface of a workcell. The first docking module may provide an electrical and mechanical interface between a first peripheral and the workcell. The method may also include determining an identification of an attached first peripheral. The method may also include determining a first calibration of the attached first peripheral based on the determined location and orientation of the first docking module and on the identification of the attached first peripheral. The method may also include determining a location and an orientation of a second docking module from among a plurality of modular docking bays on the surface of the workcell. The second docking module may provide an electrical and mechanical interface between a second peripheral and the workcell. The method may also include determining an identification of an attached second peripheral. The method may also include determining a first calibration of the attached second peripheral based on the determined location and orientation of the second docking module and on the identification of the attached second peripheral. The method may also include determining a second calibration of the attached first peripheral based on the location of the attached first peripheral with respect to the location of the attached second peripheral.

In another example, a modular reconfigurable workcell is provided that may include one or more modular docking bays on a surface of the workcell that support attachment of one or more docking modules in a fixed geometric configuration, and respective modular docking bays including a plurality of electrical connections for a variety of power and communication busses of the docking modules to be attached. The workcell may also include one or more docking modules inserted within the one or more modular docking bays, and the one or more docking modules provide an electrical and mechanical interface between a respective peripheral and the workcell. The workcell may also include an electrical subsystem for coupling the communication busses between the one or more modular docking bays and providing power circuitry to the one or more modular docking bays. The workcell may also include one or more structural features in the one or more modular docking bays to enable insertion of the one or more docking modules in the fixed geometric configuration such that an orientation of the one or more docking modules relative to the workcell is uniquely defined. The workcell may also include a processor for determining a first calibration of attached peripherals based on the orientation of corresponding one or more docking modules attached to the one or more modular docking bays and based on an identification of the attached peripherals of the corresponding one or more docking modules. The processor may further determine a second calibration of the attached peripherals based on a location of the one or more docking modules with respect to each other.

In another example, another method operable by a computing device is provided. The method may include receiving a request for a given task to be performed by a modular reconfigurable workcell. The method may also include determining one or more peripherals required to perform the given task. The method may also include determining an optimal placement of the one or more peripherals based on the given task, wherein the one or more peripherals are coupled to the workcell in a fixed geometric configuration based on the determined optimal placement such that an orientation of the one or more peripherals relative to the workcell is uniquely defined. The method may also include determining a first calibration of the one or more peripherals based on the orientation of the one or more peripherals relative to the workcell. The method may also include determining a second calibration of the one or more peripherals based on the optimal placement of the one or more peripherals with respect to each other.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a reconfigurable workcell is provided that includes an enclosure that houses one or more modular docking stations. The enclosure may be sealed to an exterior environment, and able to rigidly support working forces exerted by an attached robot arm or other peripheral. The enclosure may be configured to be mounted to any surface including a worktable, floor, wall, or ceiling, for example. The enclosure includes computer and power requirements, and related devices needed for workcell functionality, and may utilize the surface of the enclosure as a work surface for a specific task.

In some examples, one or more modular docking stations are exposed on a top surface of the enclosure that support plug-and-play attachment of robot peripherals and may enable a tool-less quick connect such that the peripheral can be attached with no tools. The modular docking stations include features to prevent installation of the peripheral at an incorrect orientation, and features to ensure repeatable and precise alignment of the peripheral to the enclosure. The modular docking stations also may include features that allow for electrical connection of one or more power and communication busses to the attached peripheral without use of tools or manual electrical connectors.

The modular workcell may also include a computing device positioned inside of the enclosure, or exterior to the enclosure and in communication with components of the workcell. The computing device may be used to determine a first calibration of attached peripherals based on the orientation of corresponding one or more docking modules attached to the one or more modular docking bays and based on an identification of the attached peripherals of the corresponding one or more docking modules. The computing device may further determine a second calibration of the attached peripherals based on a location of the one or more docking modules with respect to each other. In addition, the computing device may provide a wired or wireless client interface that enables a user to provide input to the workcell and visualize the workcell from a tablet, mobile phone, or other computing device. Further, the computing device may include a task verification and deployment system that informs a user if a desired task can be performed, and generates a procedure to interactively guide the user to correctly configure the workcell.

Figure 1:
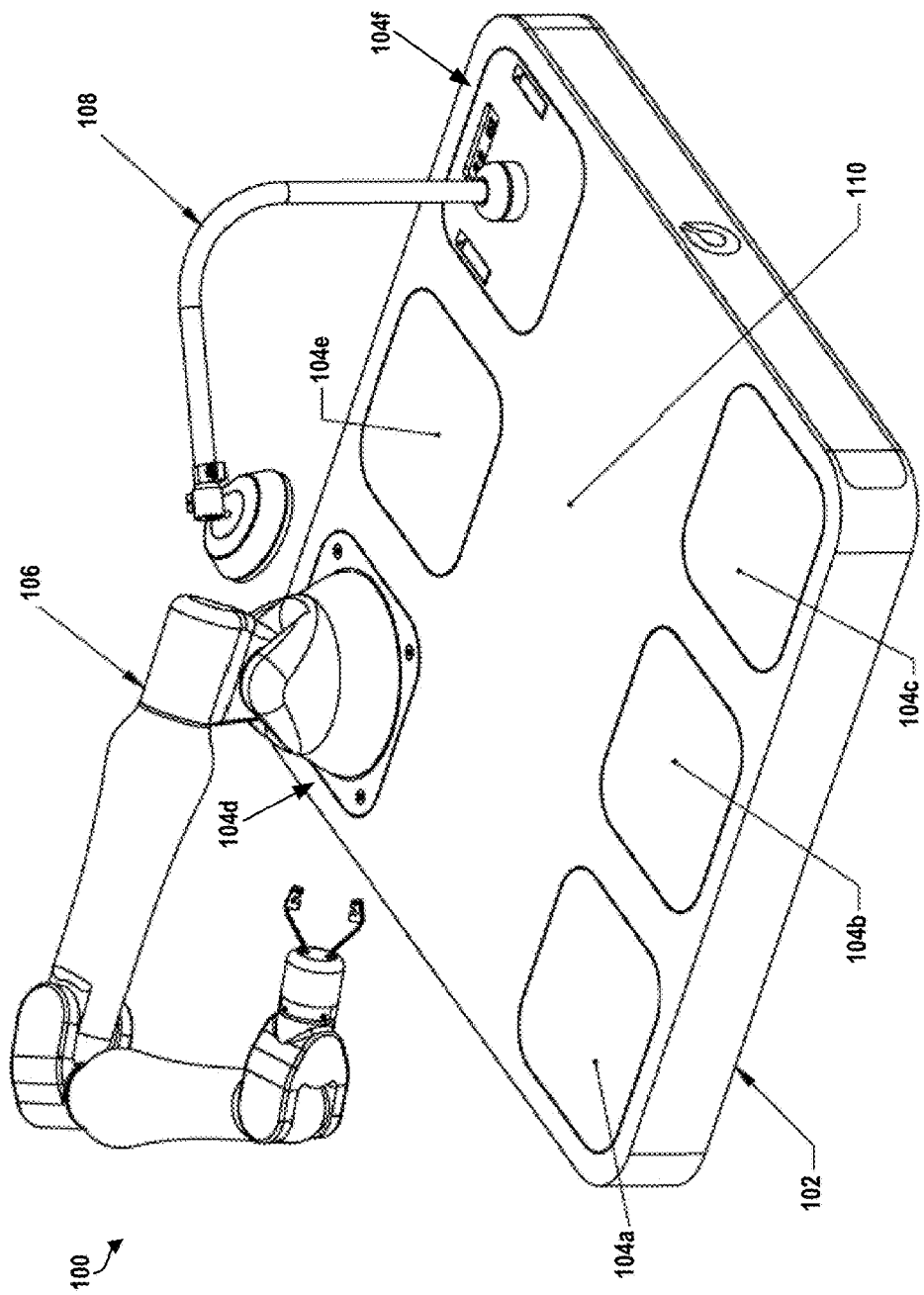
FIG. 1 illustrates an example modular reconfigurable workcell.

Referring now to the figures, FIG. 1 illustrates an example modular reconfigurable workcell 100. The workcell 100 includes an enclosure 102 with six modular docking bays 104*a-f* arranged in a 2×3 array. The modular docking bays 104*a-f* are on a surface of the enclosure 102 and support attachment of one or more docking modules in a fixed geometric configuration. The modular docking bays 104*a-f* include a plurality of electrical connections for a variety of power and communication busses of the docking modules to be attached, and the docking modules provide an electrical and mechanical interface between a respective peripheral and the workcell 100. As shown in FIG. 1, two modular docking bays 104*d* and 104*f* include docking modules inserted and configured with two peripheral modules that include a robot arm peripheral 106 and a camera peripheral 108, although any variety and configuration of peripherals may be achieved. Other example peripherals include a fixture for locating a device-under-assembly, and a measurement tool for measuring a device-under-inspection. In addition, other numbers and arrangements of docking stations may be chosen.

Each modular docking bay 104*a-f* is a location that a peripheral module can be inserted. A top of the enclosure 102 may include areas without docking stations, providing a work surface 110 for automation tasks. Because the work surface 110 is on the enclosure itself, a location of a work object and calibration may be achieved. Inclusion of areas without docking bays also creates volume inside of the enclosure 102 that is not occupied with docking bay hardware. This volume may be used for internal subsystems, such as a computing device, as an example.

As shown in FIG. 1, modular docking bays that do not have docking modules inserted, such as the modular docking bays 104*a*, 104*b*, 104*c* and 104*e*, may each include a cover installed to seal the docking bays if a peripheral is not present.

Figure 2A:
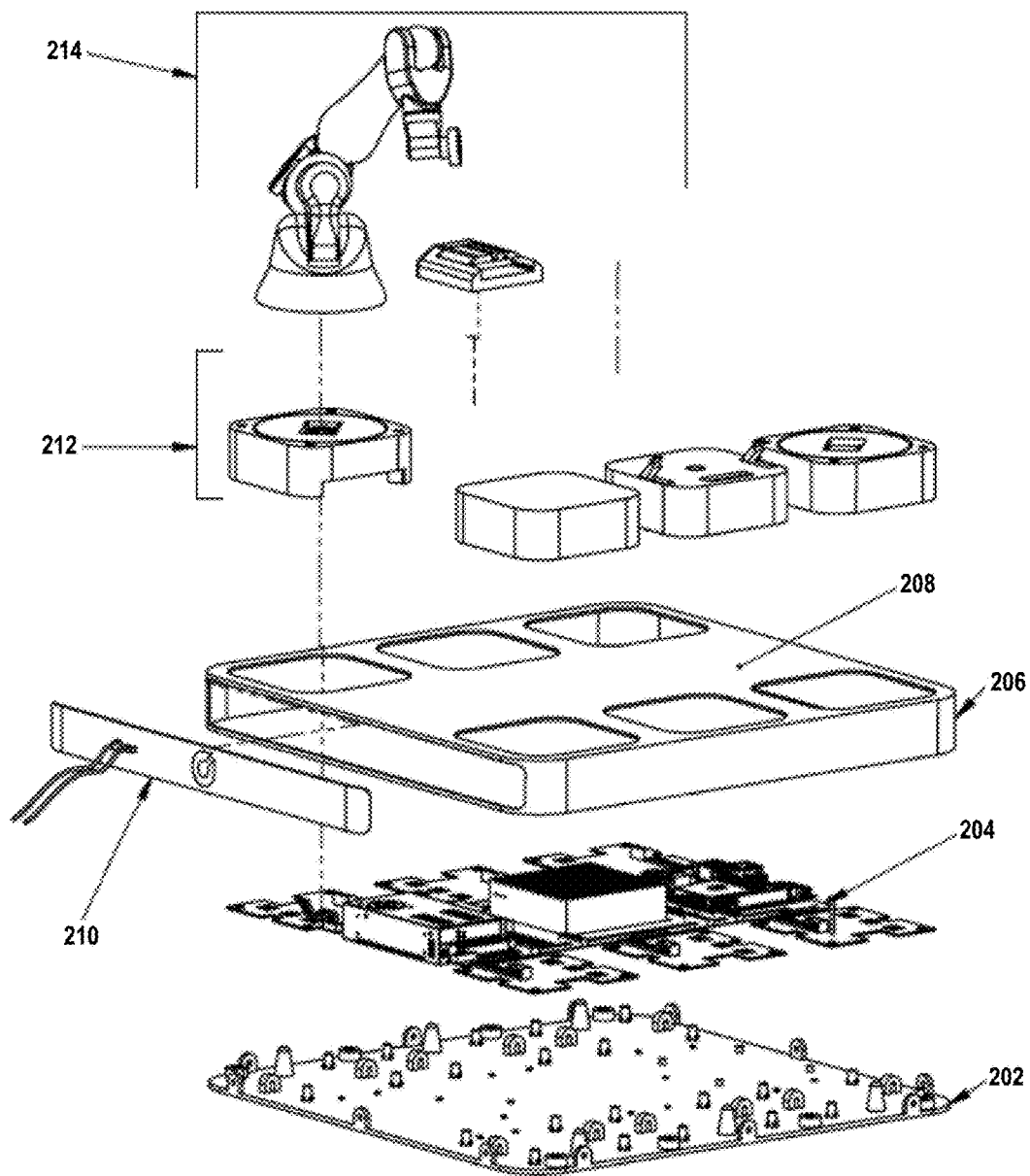
FIG. 2A illustrates an exploded view showing an example of an internal structure of an enclosure.

FIG. 2A illustrates an exploded view showing an example of an internal structure of an enclosure. The enclosure includes a bottom plate 202 that may include features for mechanically attaching peripherals. The bottom plate 202 may act as a structural element, allowing a mechanically attached peripheral to pass a load to a mounting surface of the enclosure. The bottom plate 202 may also provide features for mounting an electrical subsystem or backplane 204. The backplane 204 electrical subsystem may include computers, power supplies, and electronics that interface attached peripherals to the computers. The backplane 204 may couple communication busses between modular docking bays and provide power circuitry to the modular docking bays. The backplane 204 may be considered an electrical subsystem and may comprise or be a wire harness.

The enclosure also includes side plates 206 and a top plate 208 which form the enclosure when attached to the bottom plate 202. The enclosure may be sealed to prevent ingress of unwanted dust, liquid, or other environmental elements. The top plate 208 has identical holes cut into the top plate 208 to accommodate each docking bay.

A back panel 210 provides electrical connections for power and communication between the backplane electrical subsystem 204 and an external source. Docking modules, such as docking module 212, may be inserted into each docking bay. The docking module 212 provides an electrical and mechanical interface for integrating a wide variety of peripherals, such as the robot arm 214 to the enclosure.

Figure 2B:
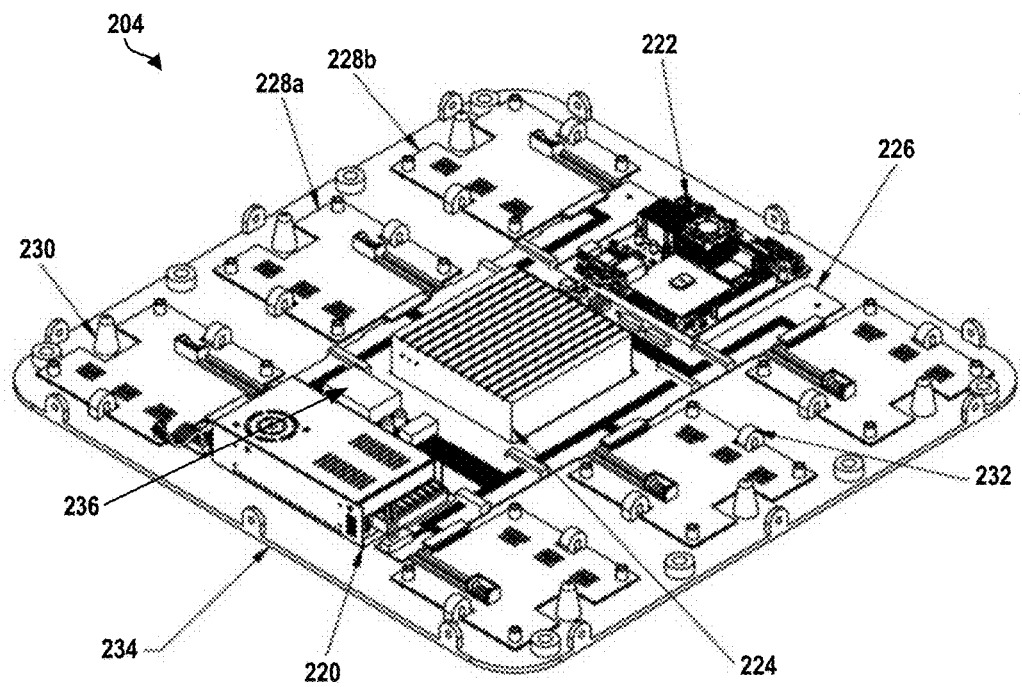
FIG. 2B illustrates an example backplane with attached subsystems.

FIG. 2B illustrates an example backplane electrical subsystem 204 with attached subsystems. The subsystems provide functionality required for the workcell. The subsystems may include a power supply 220, a control processor 222 for handling real-time control of robot arm peripherals, a task processor 224 for handling non real-time tasks, and a central backplane printed circuit board (PCB) 226 that provides electrical interconnects between one or more dock station PCBs 228a-b and the processors 222 and 224.

The backplane PCB 226 may include functionality for multiplexing communication busses, bus hubs or switches, power management circuitry, or computational resources. Each modular docking bay has an identical form factor. The dock station PCBs 228a-b may attach to the backplane PCB 226 by card edge connectors, by a wire harness, or by being part of the backplane itself. The backplane 204 may further include features for attachment and registration of docking modules. One or more tapered posts 230, latch hooks 232, or threaded extrusion features can act as a mechanical interface between a bottom plate 234 of the backplane 204 and a docking module, for example.

The backplane 204 may further include an inertial measurement unit (IMU) 236 to determine an acceleration experienced by the workcell, for example. The IMU 236 may monitor for abnormal accelerations imparted to the backplane 204. Abnormal accelerations can be an indication of a malfunctioning arm peripheral or unexpected contact with a person or other machinery. In some examples, upon detection of an abnormal acceleration, the workcell can operate in a safety fault mode. In addition, the IMU 236 can provide an orientation of the backplane 204 with respect to gravity. Some peripherals, such as a robot arm, can benefit from knowledge of a gravity vector to accomplish gravity compensation based control. The IMU 236 may output the control processor 236, which may receive the acceleration and determine an indication of a malfunctioning peripheral or contact of a peripheral with another element.

Figure 2C:
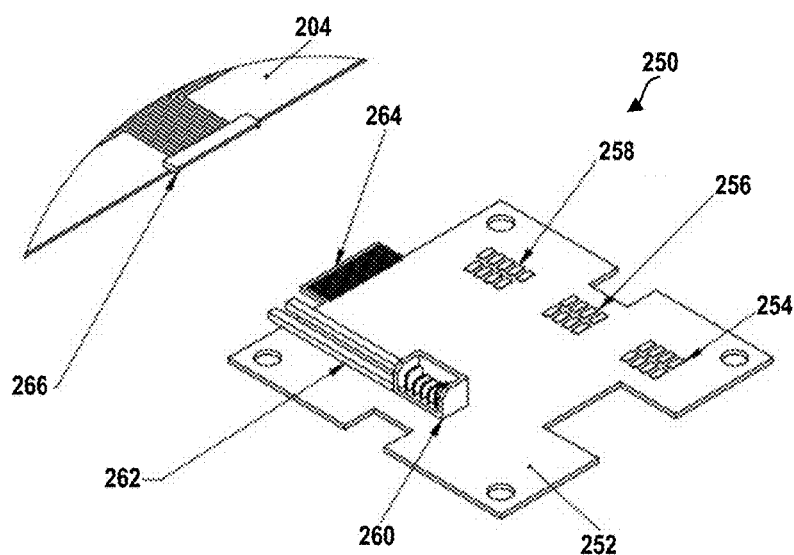
FIG. 2C illustrates an example docking station PCB that interfaces electrical signals from the backplane to a docking module.

FIG. 2C illustrates an example docking station PCB 250 that interfaces electrical signals from the backplane 204 to a docking module. The docking station PCB 250 includes a PCB 252 with one or more locations for quick electrical connect receptacles 254, 256, 258, and 260 placed such as to make an electrical connection to a corresponding connector on a docking module when a peripheral is inserted. The receptacles may be exposed foil pads, such as receptacles 254, 256, and 258, blade connectors, such as receptacles 260, or related spring electrical quick connect features. The docking station PCB 250 includes registration features to ensure precise and repeatable installation inside the enclosure. The docking station PCB 250 may include power bus bars 262 for a power bus. A PCB edge connector 264 may be employed to connect the docking station PCB 250 to a corresponding connector 266 on the central backplane PCB 204.

Figure 2D:
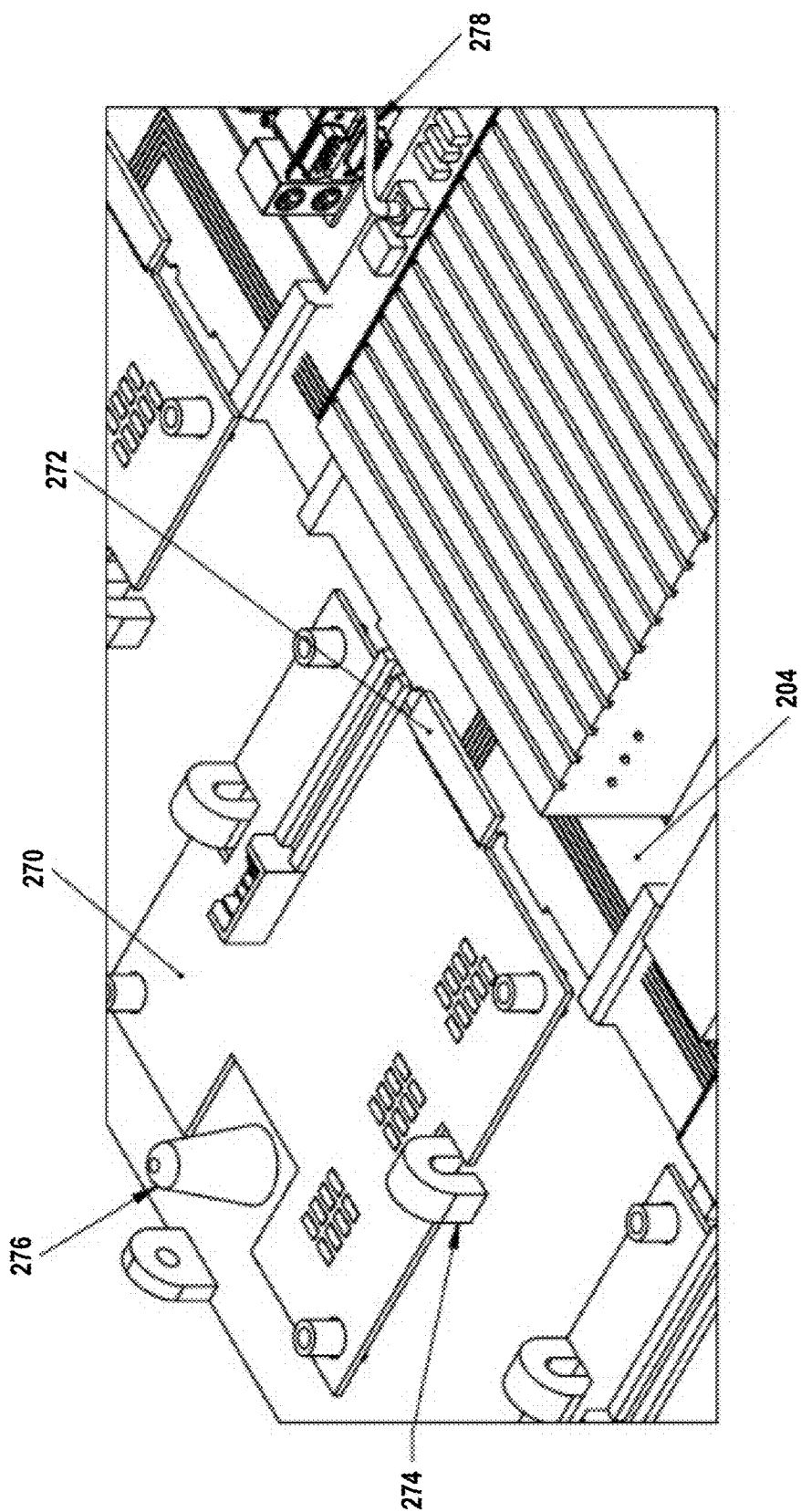
FIG. 2D illustrates a detailed view of a dock station PCB installed in the enclosure.

FIG. 2D illustrates a detailed view of a dock station PCB 270 installed in the enclosure. The dock station PCB 270 includes a card edge connector 272 attaching to the central backplane PCB 204. Also shown are mechanically connection hooks 274 and a tapered post 276 to ensure alignment during peripheral installation. The backplane PCB 204 may also provide power and communications to attached computers 278.

Thus, as shown in FIGS. 2A-2D, the workcell includes a processor in the enclosure, and one or more modular docking bays couple to one or more docking modules through the backplane and via a printed circuit board (PCB) card edge connector or a wire harness. The modular docking bays include a variety of electrical connections, such as Ethernet, Firewire, CANBUS, and USB connections, to couple to the docking modules. The enclosure further includes a power supply and a central backplane circuitry board that provides electrical interconnects between the one or more docking modules and the power supply and between the one or more docking modules and the processor. The enclosure all the one or more modular docking bays to be accessible through a surface of the workcell, and may be sealed to an outside environment.

Within examples, the workcell shown in FIGS. 2A-2D enables co-locating a peripheral with a power and control system in one enclosure to avoid a need for a connection wiring harness.

Figure 3:
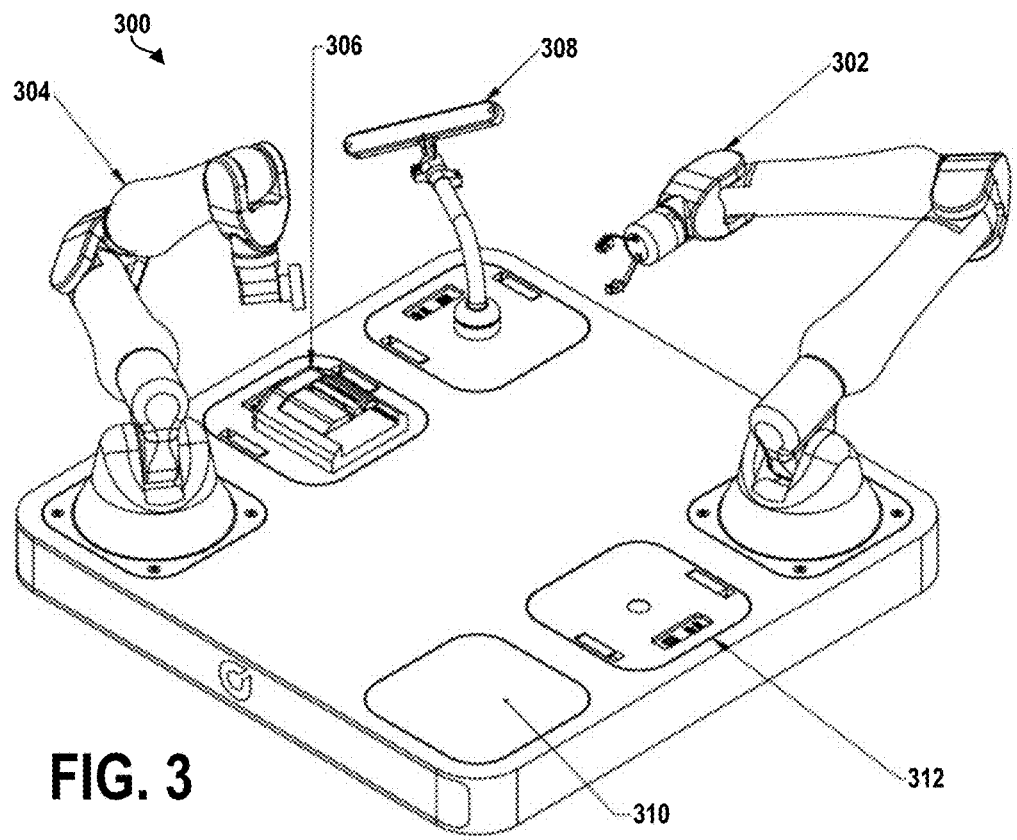
FIG. 3 illustrates an example modular reconfigurable workcell.

FIG. 3 illustrates an example modular reconfigurable workcell 300. The workcell 300 includes different peripherals installed in each docking bay including a seven degree of freedom (DOF) arm peripheral with gripper 302, a seven DOF arm peripheral with camera 304, a test device peripheral for assessing device-under-test functionality 306, a 3D sensor peripheral for measuring a location of a device-under-assembly 308, a docking bay cover 310, and an expansion input/output (I/O) peripheral 312 for interfacing to external devices such as test machines, PLCs, and safety guards. Any of the peripherals may be inserted within any docking bays and configured as desired for a specific application or task. Within examples, each modular docking bay is identical, and docking bays without inserted docking modules and peripherals may include the cover 310 cover secured over the modular docking bay to provide a uniform working surface and protect the electrical subsystem.

Figure 4:
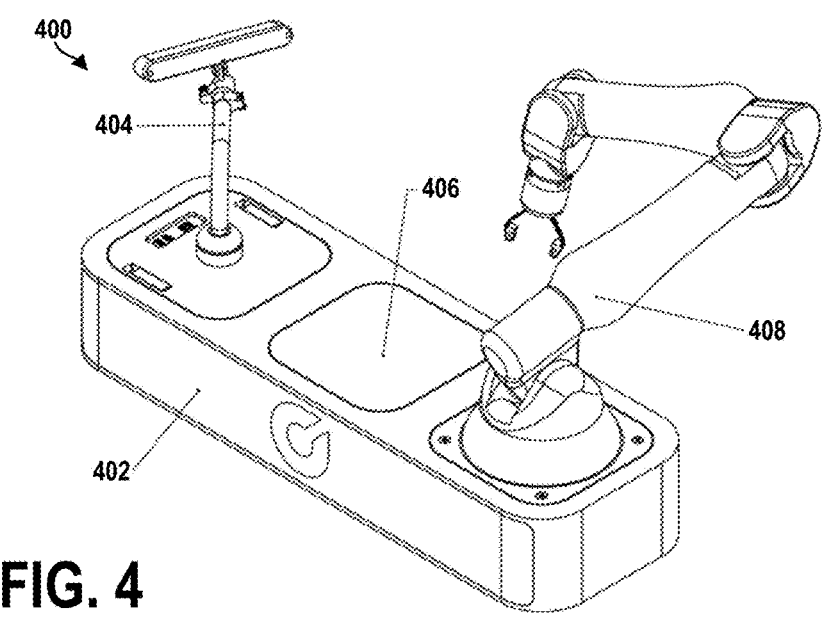
FIG. 4 illustrates another example modular reconfigurable workcell.

FIG. 4 illustrates an example modular reconfigurable workcell 400. The workcell is configured to include a 1×3 array of docking bays. In this configuration, the workcell 400 includes an enclosure 402 that has two internal layers such that internal computers, power supplies, and electronics may be positioned underneath each docking bay. In this example, an intermediate plate can be used for peripherals 404, 406, and 408 to dock to. An internal support structure can then transfer load to a base plate, for example.

Thus, within examples, workcells may be provided including modular docking bays arranged in an M×N array (e.g., 2×3 as shown in FIG. 1), and power circuitry and other computers can be arranged between rows of the modular docking bays. In other examples, workcells may be provided including modular docking bays arranged in a 1×M array (e.g., 1×3 as shown in FIG. 4), and power circuitry and computers can be arranged underneath a row of the modular docking bays.

In further examples, additional peripherals may include a sliding mechanism that couples between two docking modules, and another peripheral may attach to the slide to move from one docking bay to another. In this manner, the workcell may be positioned next to a conveyer belt, and a peripheral may move alongside the conveyer belt. Thus, multiple modules may be coupled together with a slide to combine two modules and extend a reach of one or more peripherals. The modules would be able to exchange geometry information with each other and the slide to perform calibration, for example.

Figure 5:
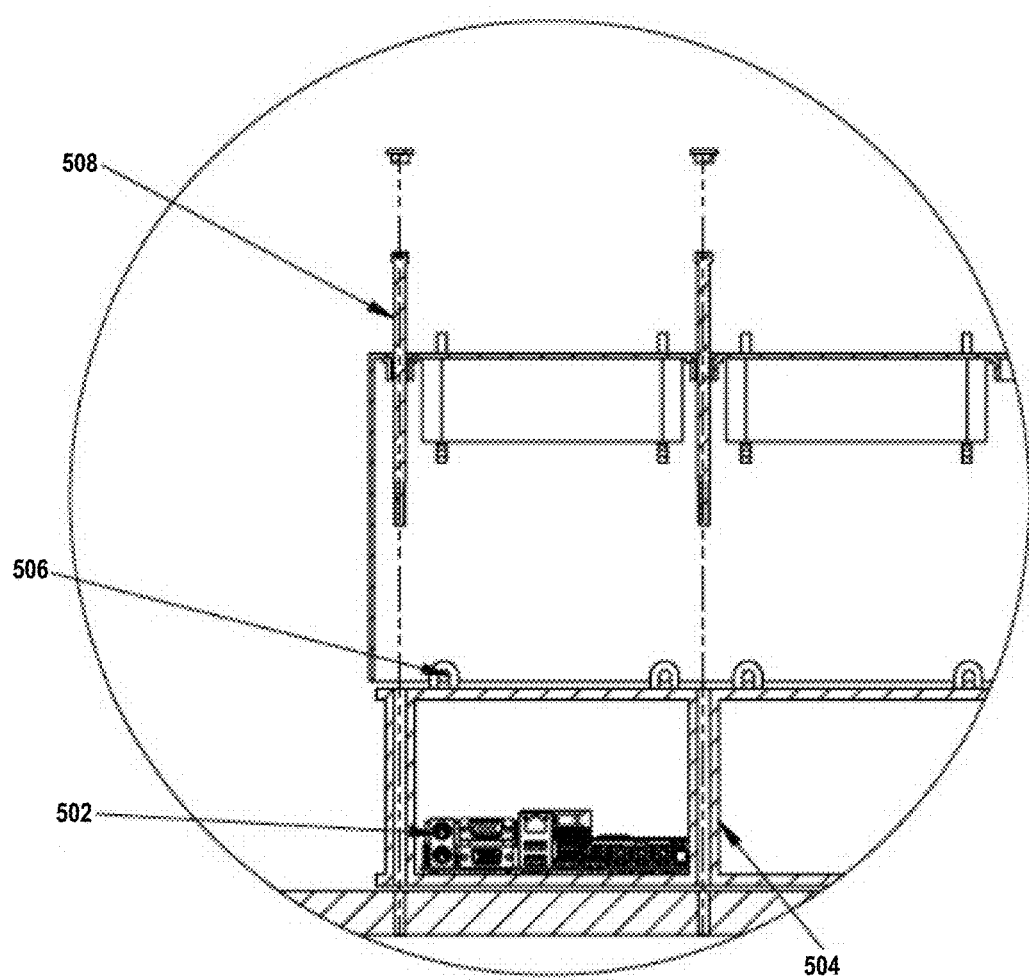
FIG. 5 illustrates an example two layer construction of an enclosure to support a 1×3 arrangement of docking bays and similar arrangements.

FIG. 5 illustrates an example two layer construction of an enclosure to support a 1×3 arrangement of docking bays and similar arrangements. In FIG. 5, internal electronics 502 within a lower layer are provided and constructed within a rigid metal frame 504. A docking module mounting plate 506 is attached to a top of the metal frame 504 such that docking modules can be attached to the docking module mounting plate 506 with bolts 508 or a similar mechanism.

Figure 6:
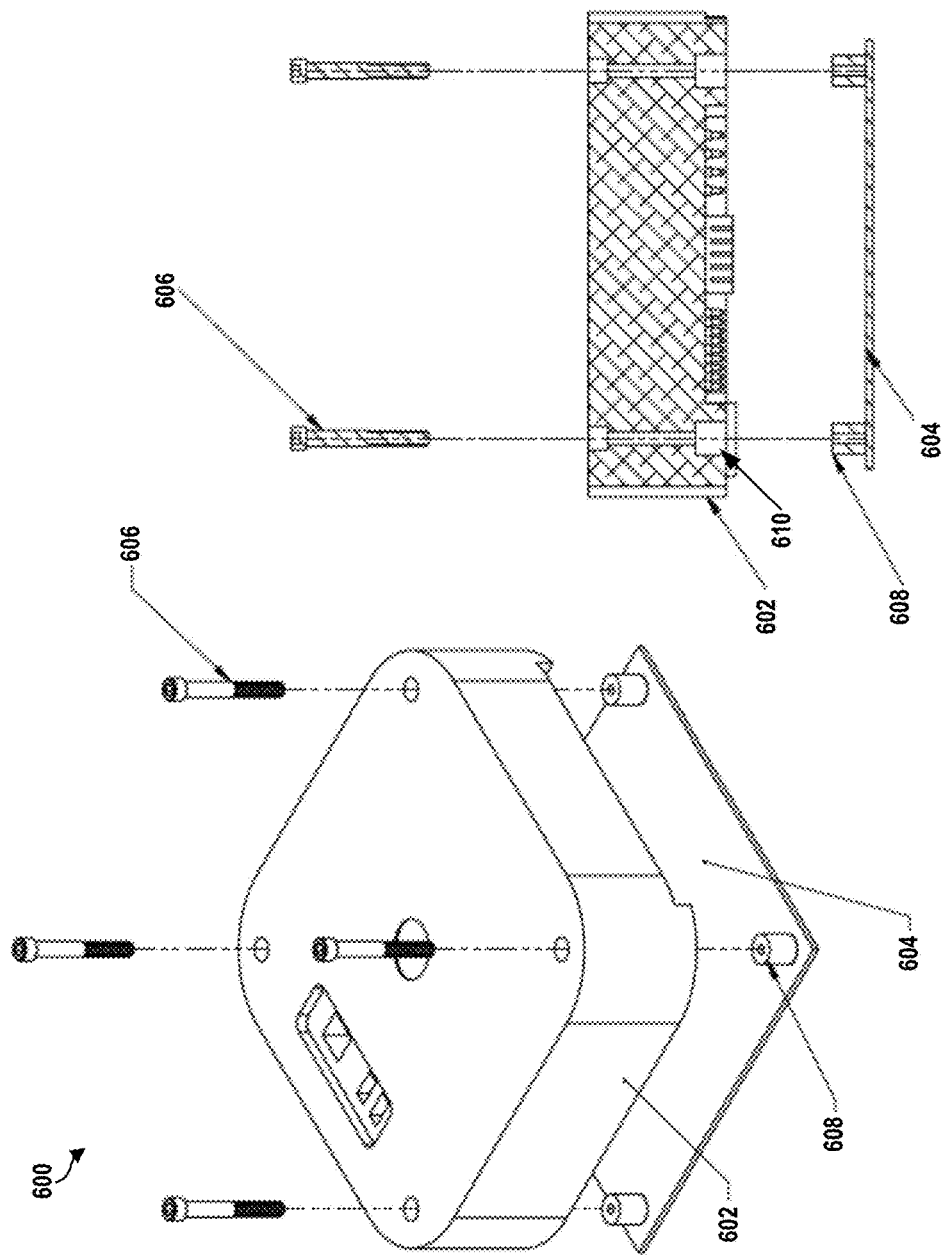
FIGS. 6A-6B illustrate a top and cross-sectional view of an example docking module 600.

FIGS. 6A-6B illustrate a top and cross-sectional view of an example docking module 600. The docking module 600 functions as an electrical and mechanical interface between a peripheral and the enclosure. The docking module 600 includes a housing 602 that transfers load from a peripheral to a bottom plate 604 of the enclosure. If the peripheral can produce high loads, such as with a robot arm, the housing 602 may be a rigid metal. If the peripheral produces lighter loads, such as with a camera, the housing 602 may be an injection molded plastic. Alternatively, the peripheral load may be transferred to the mounting surface through the enclosure shell. In this example, the enclosure side plates may be extruded, machined, cast, or sheet metal.

The docking module 600 may be inserted through a top of a base of a workcell along a single direction. The docking module 600 may be attached with one or more bolts 606 that screw into threaded features in the bottom plate 604. Each threaded feature may include an extended boss 608 that acts to precisely align the docking module 600 to the bottom plate 604 and to provide load transfer between the docking module 600 and the bottom plate 604. The boss 608 may include a taper to allow for initial alignment.

A threaded feature on the bottom plate 604 may form a precise slip fit with a receptacle 610 on the housing 602, as shown in FIG. 6B, to precisely align the docking module 600. Within examples, non-symmetric spacing of these features ensures that there is only one achievable insertion orientation.

Attachment and registration features of the housing 600, such as the receptacle 610, act to provide handedness such that a pose and orientation of the docking module 600 relative to the bottom plate 604 is precisely and uniquely defined. This allows a geometric calibration of an attached peripheral to be specified at design time up to a precision of a manufacturing process. Thus, the receptacle 610 may be a structural feature in the docking module 600 that aligns with the boss 608 structural feature of the modular docking bays to enable insertion of the docking module 600 in the fixed geometric configuration such that an orientation of the docking module 600 relative to the workcell is uniquely defined.

Figure 7:
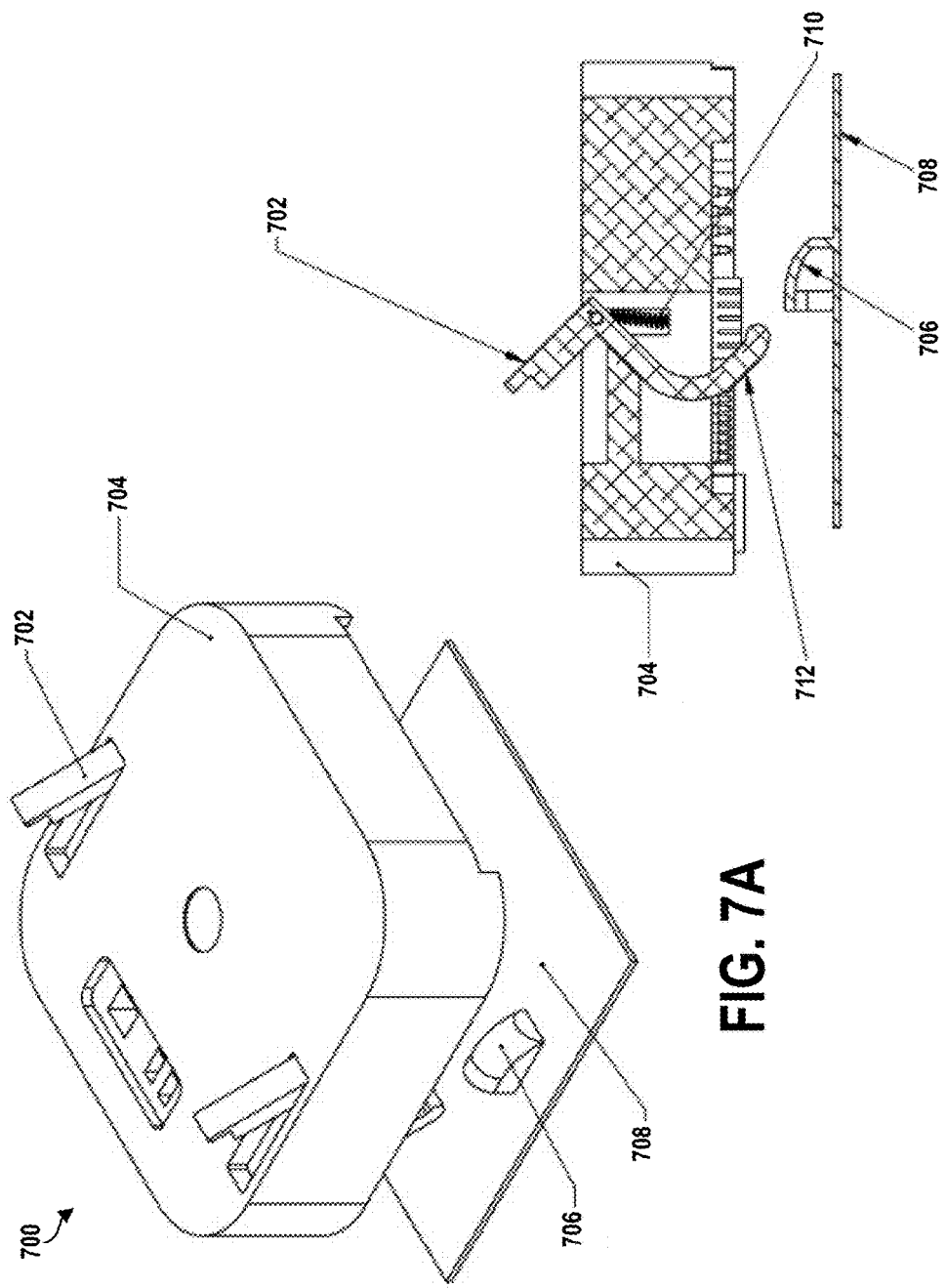
FIGS. 7A-7B illustrate insertion of an example docking module.

FIGS. 7A-7B illustrate insertion of an example docking module 700. The docking module 700 may be inserted using a tool-less method, for example. In this example, one or more lever arms 702 on a housing 704 of the docking module 700 engage with hooks 706 attached to a mounting plate 708. When the lever arm 702 is engaged with the hook 706, a constant clamping force is generated between the docking module 700 and the mounting plate 708. This force can be generated using a spring 710 or by using an over center cam contour 712 in the lever arm 702. The spring 710 allows the lever arm to flip into an up position when the docking module 700 is detached. Other mechanisms can be used to generate a same effect of creating a rigid connection by a constant pressure between the docking module 700 and the mounting plate 708.

Figure 8:
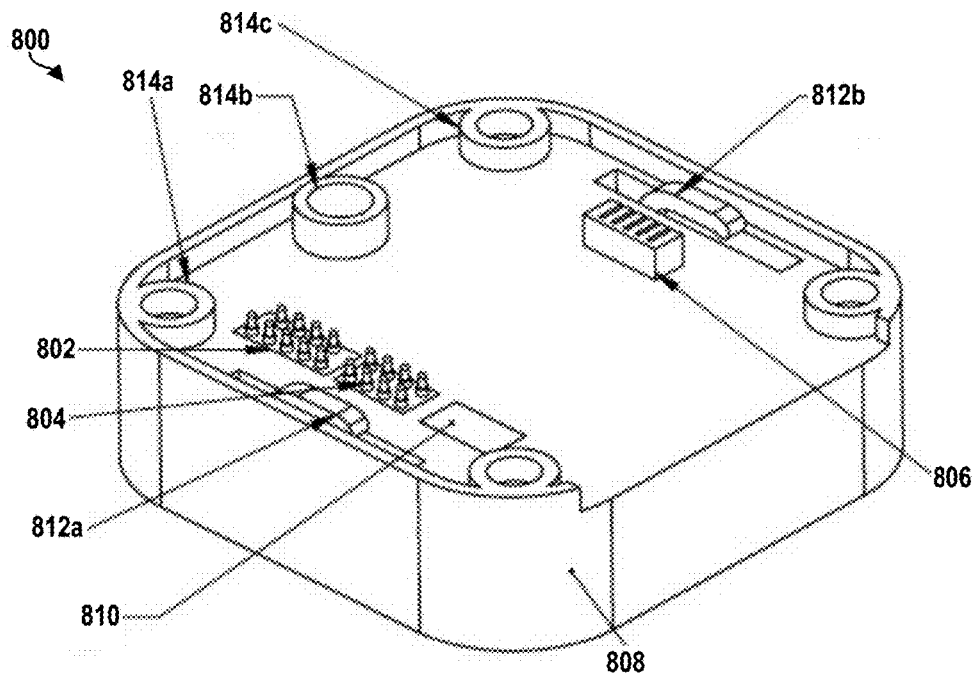
FIG. 8 illustrates a bottom view of an example docking module.

FIG. 8 illustrates a bottom view of an example docking module 800. The docking module 800 enables electrical quick connections between peripheral electronics and enclosure electronics. To achieve an electrical quick connection, spring loaded pin connectors 802 and 804 (e.g., pogo pins) may be used to contact against foil of a rigid PCB. Alternatively, a metal blade connector 806 can be used that inserts into a mating receptacle. Other similar quick connect technologies can be employed that enable appropriate tolerance to misalignment during module insertion.

The docking module 800 including a housing 808 which includes a PCB that provides the quick-connect connectors 802, 804, 806, and 810. Each connector is routed on the PCB or wiring harness to internal electronics of the peripheral. A location and function of each connector can be a fixed according to an electrical interface specification. This allows for modular connection of a range of peripheral devices that adhere to the electrical interface specification.

As shown in the FIG. 8, the connector 802 is a nine-pin bus, the connector 804 is an eight-pin bus, and the connector 806 is a five-blade power bus. If a peripheral does not support a particular connector functionality, a location of the connector may be left blank, as shown by the connector location 810. A docking module needs to only populate pins for the communication and power busses that are required for that specific module. A geometric arrangement is such that absence of a connector's spring pins results in no electrical connection being made to the peripheral for that particular bus.

The docking module 800 is also shown to include features to couple to a bottom plate, such as lever arms 812a-b, and alignment receptacles 814a-c. The alignment receptacles 814a-c may align with extended bosses within which screws can be inserted to fasten the docking module to the bottom plate, for example.

Figure 9:
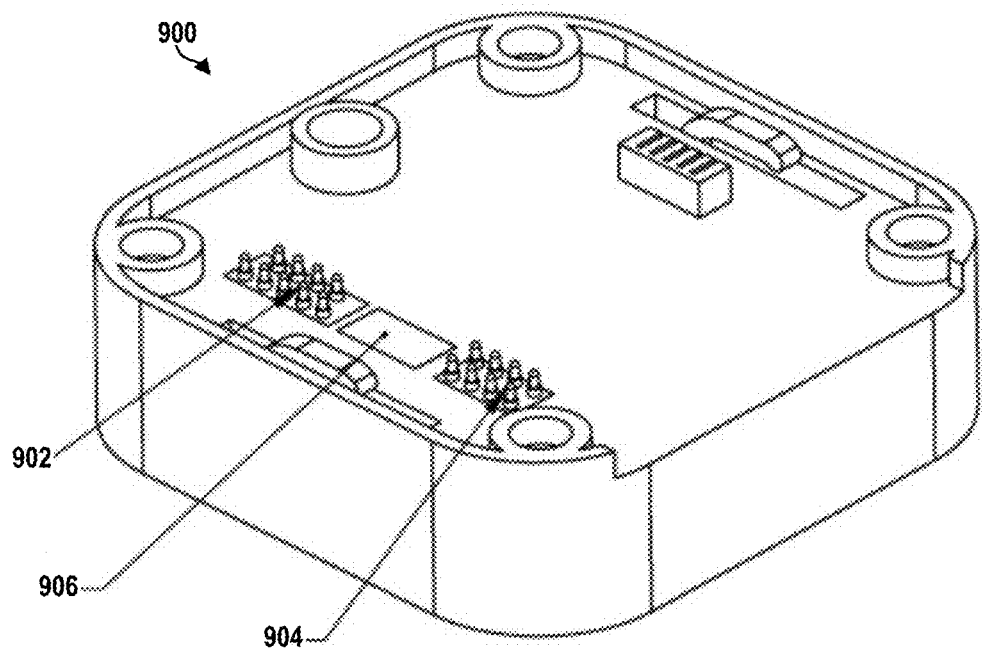
FIG. 9 illustrates a bottom view of another example docking module.

FIG. 9 illustrates a bottom view of another example docking module 900. In FIG. 9, an alternate spring connector configuration is provided for the docking module 900. In this configuration, a peripheral supports a nine-pin bus 902 and an eight-pin bus 904 as well as a power bus. Another bus location 906 is not supported, and is left blank. Thus, docking modules can provide different types of buses, and by populating different component locations of the docking modules, a customized connection can be implemented for a specific peripheral.

Figure 10:
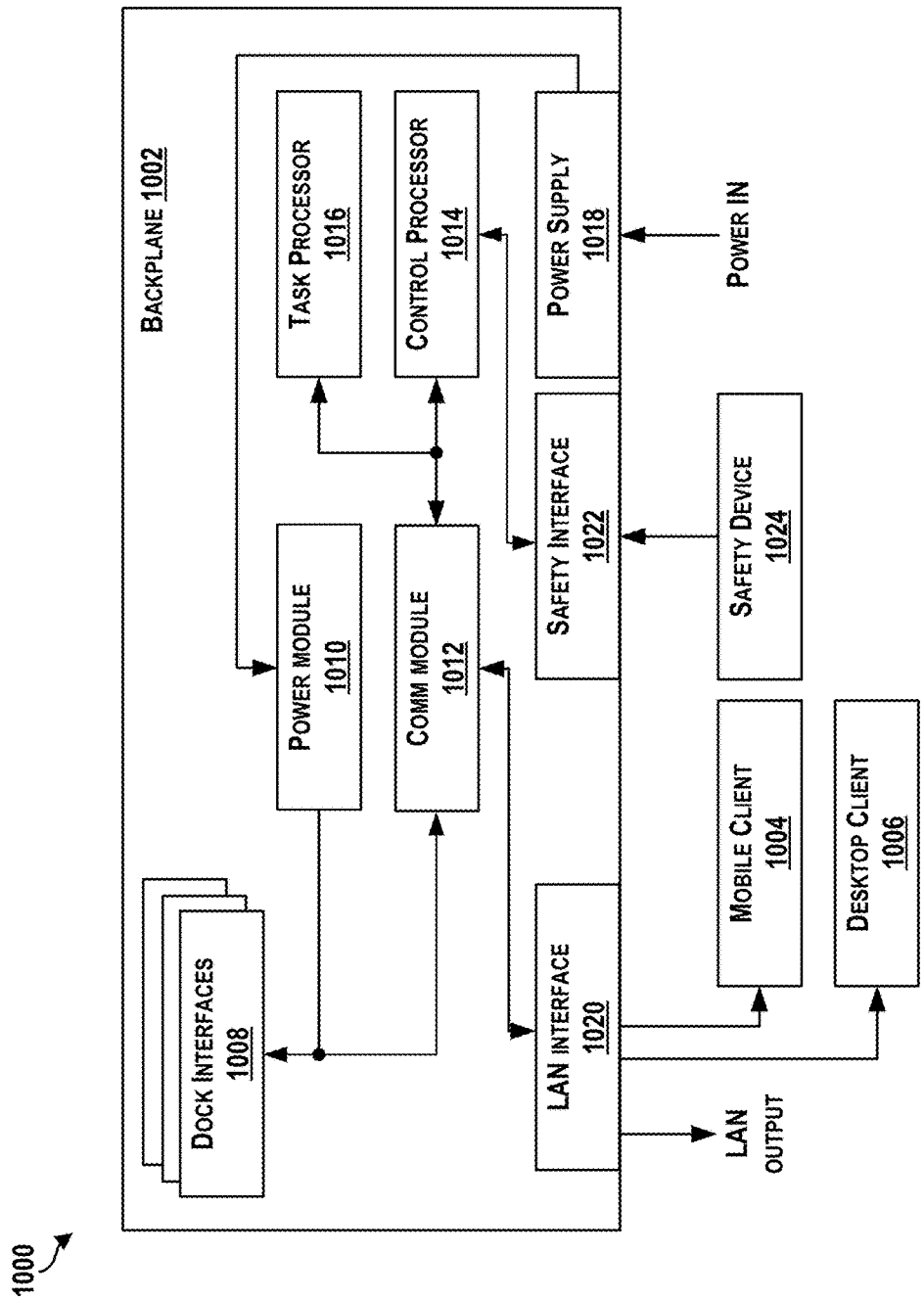
FIG. 10 is a block diagram illustrating example functional architecture of components of a workcell.

FIG. 10 is a block diagram illustrating example functional architecture of components of a workcell 1000. The workcell includes a backplane electrical subsystem 1002 that couples to clients, such as a mobile client 1004 and a desktop client 1006, or other integrated displays and input devices that provide graphical user interfaces to allow a user to configure and program the workcell 1000. For instance, the mobile client 1004 may be a tablet device that communicates wirelessly with the workcell 1000.

The backplane 1002 includes modular bay dock interfaces 1008, a power module 1010, a communication module 1012, a control processor 1014, a task processor 1016, a power supply 1018, a local area network (LAN) interface 1020, and a safety interface 1022.

The backplane 1002 provides electrical interconnection of the dock interfaces 1008, the power module 1010, the communication module 1012, and CPUs 1014 and 1016. The backplane 1002 may comprise one or more interconnected PCBs. The modular bay dock interfaces 1008 enable a docking module to couple to the workcell 1000. For example, the dock interface 1008 provides digital communication, power, and mechanical attachment to attached peripherals, and may define electrical, mechanical, and software standards required of all compatible peripherals.

The power module 1010 distributes power from the power supply 1018 to each dock interface 1008 and processor 1014 and 1016. The power module 1010 may include power monitoring, soft start, safe shutdown, and uninterruptable power supply features. The power supply 1018 may convert battery or line (AC) power to generate one or more supply voltages required to power the connected peripherals and the on-board computers.

The communication module 1012 may route communication bus signals from each dock interface 1008 to network interfaces of the CPUs and LAN. The communication module 1012 may comprise one or more USB, EtherCAT, Ethernet hubs, switches, or crossover pass through, as well as other common bus types. The LAN interface 1020 provides a wired or wireless networked connection from the backplane 1002 to other devices.

The control processor 1014 provides deterministic real-time control of one or more actuated devices, and communicates on a real-time control bus (such as EtherCAT) to each dock interface 1008. The task processor 1016 provides task execution services, computation for sensing and perception, data management and analytics services, non real-time control of actuated devices, and network interfaces (USB, Ethernet) to external devices. The task processor 1016 and control processor 1014 may be separate cores on one CPU, a single core, or separate cores on separate computers, as desired.

The safety interface 1022 provides electrical and mechanical connection of an external safety device 1024 (such as an emergency-stop) to the backplane 1002.

The workcell 1000 may be provided in an enclosure, and a top plate of the enclosure functions as a calibrated work surface for an automation task. The work surface may include mounting points for attaching stationary items to enable the task, such as assembly jigs.

To kinematically register a docking module to the enclosure, any number of methods may be used. One method includes engaging three pins in the bottom plate of the backplane 1002 into three slots in the docking module housing. This uniquely and precisely constrains an orientation of the module with respect to the bottom plate when installed.

The workcell 1000 may include features to seal the enclosure when a peripheral is installed. For example, a gasket or rubber o-ring can be attached to the peripheral docking module bottom side. The enclosure top plate has a mating lip feature. When the module is installed, a clamping force of the module to the enclosure bottom plate causes the gasket to form a seal between the peripheral and the top plate.

The workcell 1000 may be attached to a flat surface such as a table, wall, or ceiling. The bottom plate may include through-hole features such that a bolt from above may attach the bottom plate to the surface. A removeable plug seal may be employed to access an attachment feature yet keep the enclosure sealed. Conversely, the bottom plate may include thread hole features such that a bolt from below may pull the bottom plate into the surface.

The workcell 1000 can include lighting (LED) and speakers to provide feedback to a user during operation and during configuration. These modalities can be used to notify a user of a malfunction or that the workcell 1000 is in operation. These modalities can also be used to enhance a user experience. For example, an audible 'click' can be generated whenever a peripheral is plugged in and successfully interrogated.

Figure 11:
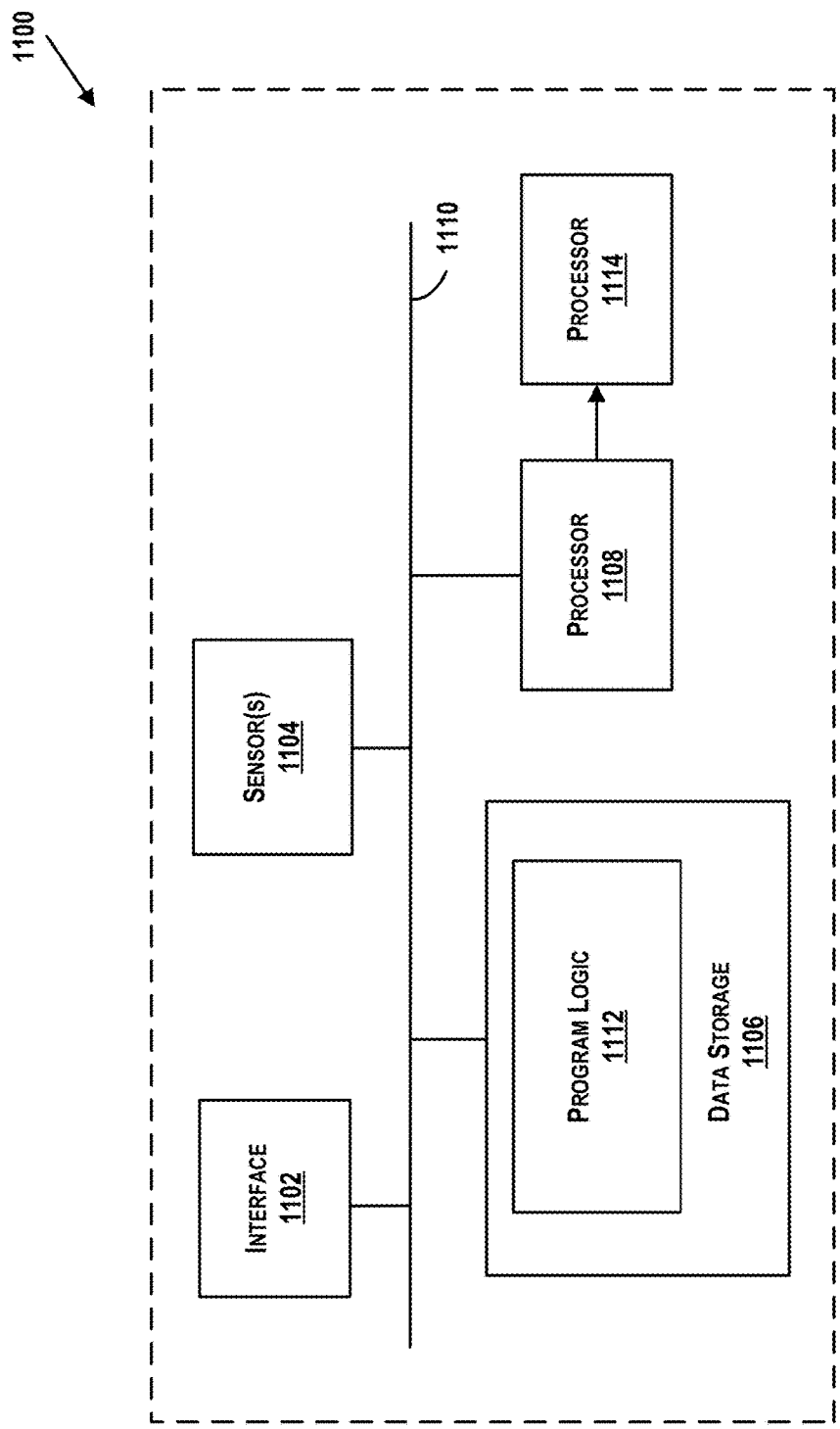
FIG. 11 illustrates a schematic drawing of an example computing device.

Many components of the workcell 1000 may take the form of a computing device, such as illustrated in FIG. 11, which illustrates a schematic drawing of an example computing device 1100. In some examples, some components illustrated in FIG. 11 may be distributed across multiple computing devices. However, for the sake of example, the components are shown and described as part of one example device 1100. The device 1100 may be or include a mobile device, desktop computer, tablet computer, or similar device that may be configured to perform the functions described herein.

The device 1100 may include an interface 1102, sensor(s) 1104, data storage 1106, and a processor 1108. Components illustrated in FIG. 11 may be linked together by a communication link 1110. The communication link 1110 is illustrated as a wired connection; however, wireless connections may also be used. The device 1100 may also include hardware to enable communication within the device 1100 and between the device 1100 and another computing device (not shown), such as a server entity. The hardware may include transmitters, receivers, and antennas, for example.

The interface 1102 may be configured to allow the device 1100 to communicate with another computing device (not shown), such as a server. Thus, the interface 1102 may be configured to receive input data from one or more computing devices, and may also be configured to send output data to the one or more computing devices. The interface 1102 may also be configured to receive input from and provide output to a torque controlled actuator, modular link of a robot arm, or other peripheral of a docking module, for example. The interface 1102 may include a receiver and transmitter to receive and send data. In other examples, the interface 1102 may also include a user-interface, such as a keyboard, microphone, touchscreen, etc., to receive inputs as well.

The sensor 1104 may include one or more sensors, or may represent one or more sensors included within the device 1100. Example sensors include an accelerometer, gyroscope, pedometer, light sensors, microphone, camera, or other location and/or context-aware sensors that may collect data of the peripheral (e.g., motion of arm) and provide the data to the data storage 1106 or processor 1108.

The processor 1108 may be configured to receive data from the interface 1102, sensor 1104, and data storage 1106. The data storage 1106 may store program logic 1112 that can be accessed and executed by the processor 1108 to perform functions executable to determine instructions for operation of the robot arm. Example functions include calibration of attached peripherals, operation of attached peripherals, safety detection functions, or other application-specific functions. Any functions described herein, or other example functions for the workcell may be performed by the device 1100 or processor 1108 of the device via execution of instructions stored on data storage 1106.

The device 1100 is illustrated to include an additional processor 1114. The processor 1114 may be configured to control other aspects of the device 1100 including displays or outputs of the device 1100 (e.g., the processor 1114 may be a GPU). Example methods described herein may be performed individually by components of the device 1100, or in combination by one or all of the components of the device 1100. In one instance, portions of the device 1100 may process data and provide an output internally in the device 1100 to the processor 1114, for example. In other instances, portions of the device 1100 may process data and provide outputs externally to other computing devices.

The computing device 1100 may be configured to determine calibrations of attached peripherals to the workcell, for example. A geometry of a work surface of the workcell is known as is a relative pose of all docking bays, mounting points, and docking modules. This knowledge enables calibration of peripherals when attached. Parts of the work surface may also be formed by the docking station covers. In one example, the processor 1108 may determine a first calibration of attached peripherals based on a location and the orientation of corresponding docking modules attached to the modular docking bays and based on an identification of the attached peripherals of the corresponding one or more docking modules. The processor 1108 may further determine a second calibration of the attached one or more peripherals based on the location of the attached one or more peripherals with respect to each other.

An identification of the attached peripheral may be received in a number of ways. As one example, the peripheral may be attached to a workcell using an electrical connection (e.g., through a module as shown in FIGS. 8-9). In this example, data may be electrically provided that indicates information of the peripheral.

In another example, the peripheral may be attached to a module that couples to a docking bay mechanically. A set of pins or knobs may be actuated or pressed via inserted of the peripheral, and a certain combination of actuated pins or knobs may be associated with a peripheral identification. The processor 1108 may determine the set of actuated pins, and access a lookup table to determine what peripheral is associated with the actuated pins so as to mechanically identify the peripheral using no electrical communication to the peripheral or module, for example. Thus, a property of a mechanical interface may uniquely identify the peripheral and the workcell may lookup geometry information from a database that can be updated by a user. This may enable 3D-printing of custom peripherals and more dynamic extension of the workcell in the field.

In still further examples, a combination of mechanical and electrical connections and communications may be used to identify attached peripherals.

In response to the determined identification of a respective attached peripheral, the processor 1108 may receive from the respective attached peripheral a peripheral description file of the respective attached peripheral. The peripheral description file may allow the respective attached peripheral to self-identify to the workcell. A peripheral description file may be in XML or other file format. Each peripheral can support the peripheral description file in various ways. In one example, the peripheral description file is embedded in the memory of the peripheral itself. In such an example, when the peripheral is coupled to the workcell, the processor 1108 can interrogate the peripheral though the communication bus to obtain its description. In another example, the peripheral description file is hosted on a server, the Internet, or the workcell computing device. The peripheral may have an identification in the form of a barcode, or RFID tag. In such an example, when the peripheral is coupled to the workcell, the processor 1108 can obtain the identification and use the identification to access the peripheral description file. Such a configuration allows the descriptions of many peripherals to be maintained and updated remotely. In yet another example, a user may manually specify the attached peripheral. Other examples are possible as well.

The peripheral description file may include one or more of geometric features, location of one or more relevant coordinate frames, kinematic properties, mass properties, range-of-motion constraints, calibration parameters, installation instructions, secure authentication keys, and diagnostic data. The processor 1108 may receive, from a respective attached peripheral, the peripheral description file of the respective attached peripheral including geometric features of the attached peripheral upon attachment of a corresponding docking module of the respective attached peripheral to the modular docking bays. The processor 1108 can determine a first calibration based on the orientation of corresponding one or more docking modules attached to the one or more modular docking bays and based on an identification of the attached peripherals of the corresponding one or more docking modules. The processor 1108 can determine a second calibration of the attached peripherals based on a location of the one or more docking modules with respect to each other. Thus, given a description of the peripheral, location of the peripheral inserted into the modular bay, and orientation of the docking module, the processor 1108 can determine calibration parameters of the workcell.

Calibration parameters may include distances between respective peripherals and orientations and poses between respective peripherals to enable respective peripherals to interact with each other. The configuration of the workcell and modular docking bays forces a specific orientation of attached peripherals in a limited number of ways. Using the forced constraints, the calibration parameters can be determined or identified from a known set of calibration parameters stored in memory. As an example, the known calibration parameters can be predetermined for any number of permutations of example configurations of parameters, and once the attached peripherals are identified and a location of each is determined, the stored parameter file can be accessed to determine the corresponding parameters that match a current configuration of the workcell.

Figure 12:
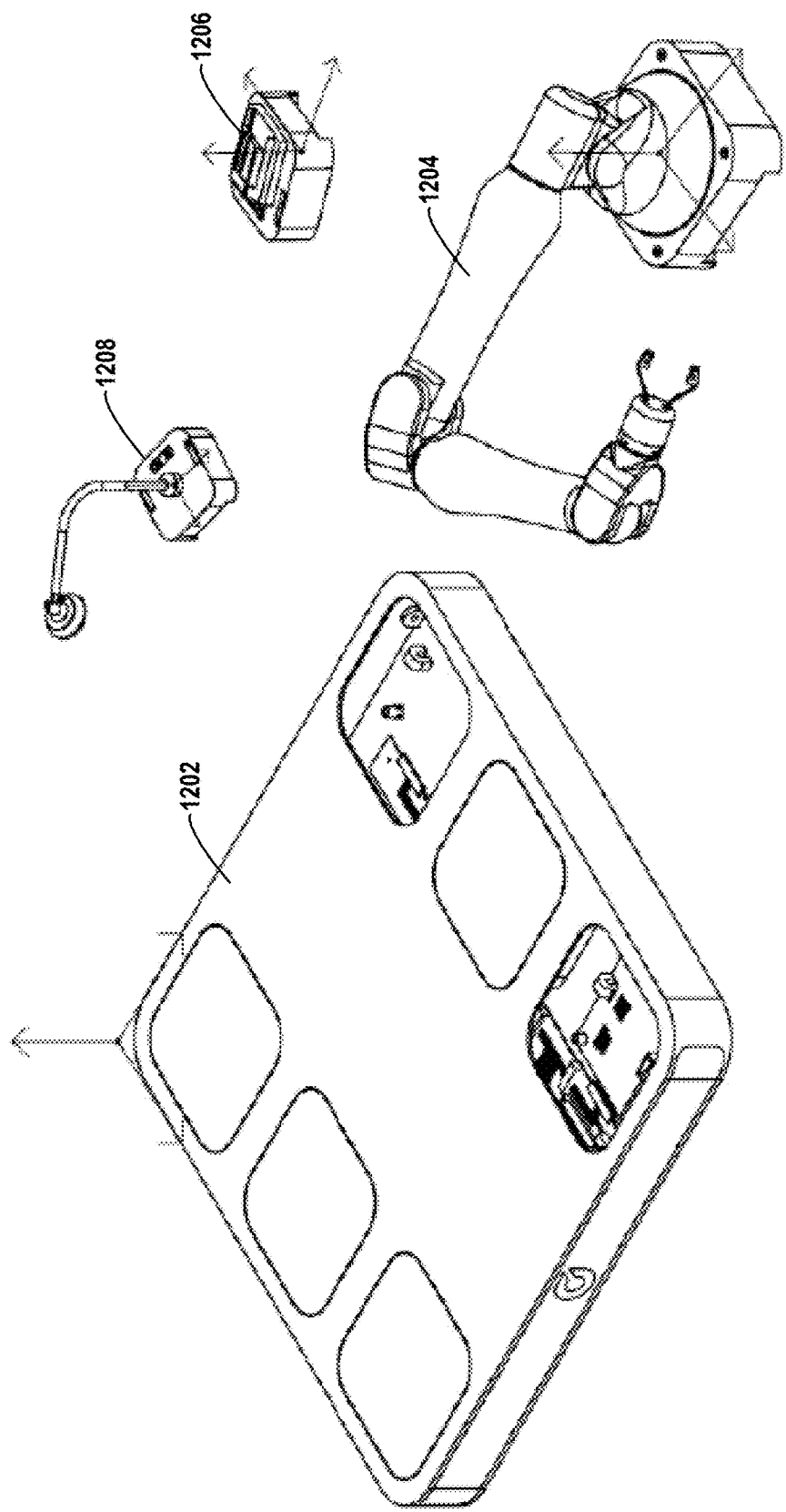
FIG. 12 illustrates example coordinate frames for a workcell and peripherals.

FIG. 12 illustrates example coordinate frames of the workcell 1202 and three peripherals: a robot arm 1204, a testing peripheral 1206, and a camera 1208. When a peripheral is attached to a particular docking station, the workcell computes a rigid 6D transformation (position and orientation) between the coordinate frame of the workcell 1202 and the coordinate frame of the given peripheral. This first calibration is achieved because the modular docking stations only allow peripherals to be attached in known positions and orientations, as discussed above.

Figure 13B:
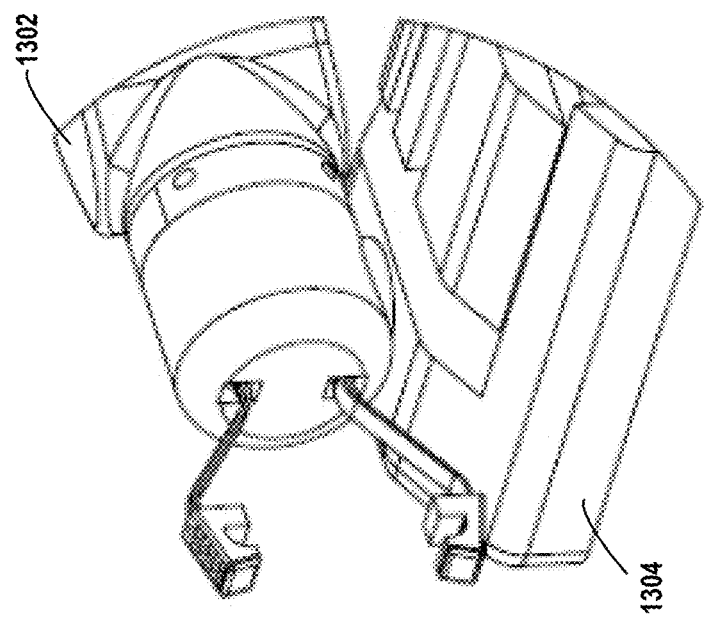
FIGS. 13A-13B illustrate an example second calibration between a robot arm peripheral and a testing peripheral.
Figure 13A:
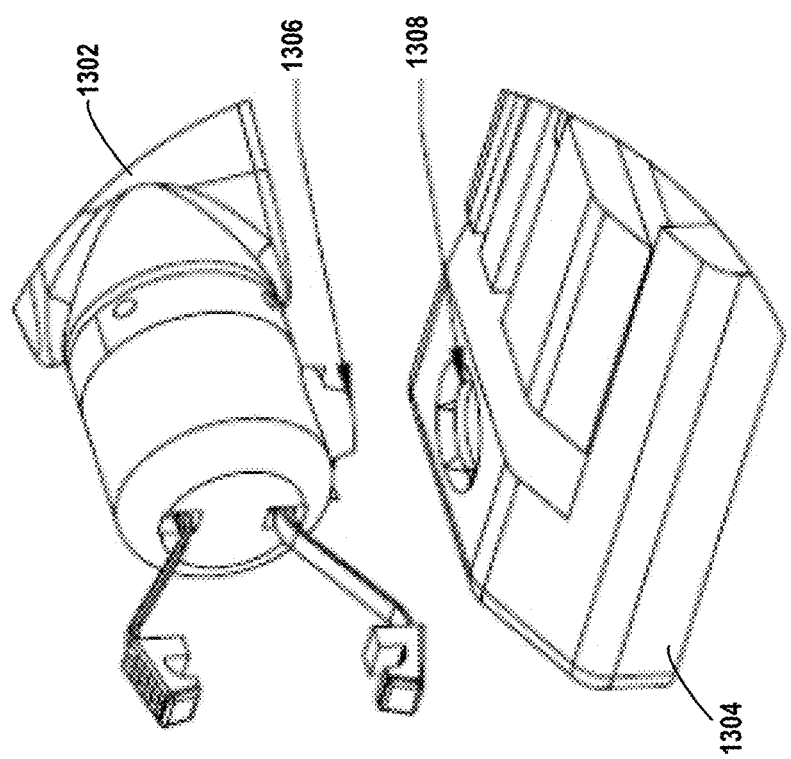

FIGS. 13A-13B illustrate an example second calibration to achieve a high accuracy calibration between a robot arm peripheral 1302 and a testing peripheral 1304. As shown in FIG. 13A, the robot arm 1302 may include a three-dimensional feature 1306 that mates with a corresponding feature 1308 on the testing peripheral 1304. Once the two features are mated, as shown in FIG. 13B, the transformation between the robot arm 1302 and the testing peripheral 1304 can be estimated with high accuracy. The mating can be done manually, by a user physically moving the robot arm 1302 or controlling the motion of the robot arm 1302 via an external device. Alternatively, the robot arm 1302 can autonomously mate the features by using the transformation from the first calibration as an initial estimate and force feedback and low impedance to achieve mating with tight tolerances.

Figure 14B:
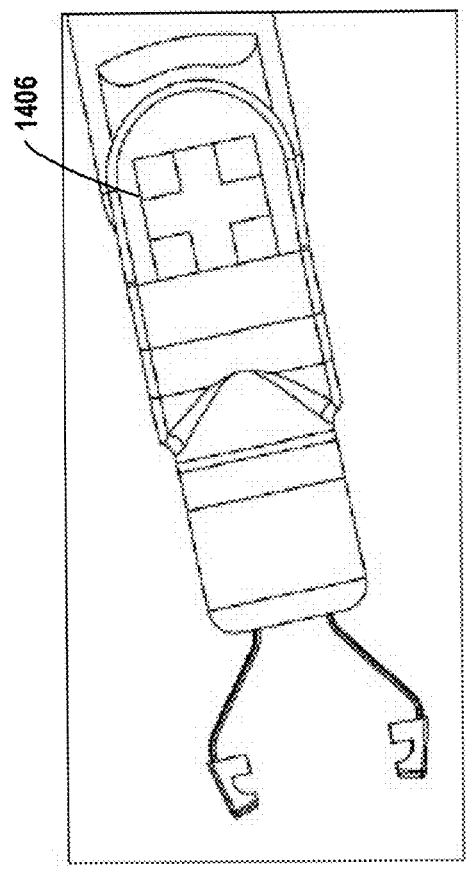
FIGS. 14A-14B illustrate an example second calibration between a camera peripheral and a robot arm peripheral.
Figure 14A:
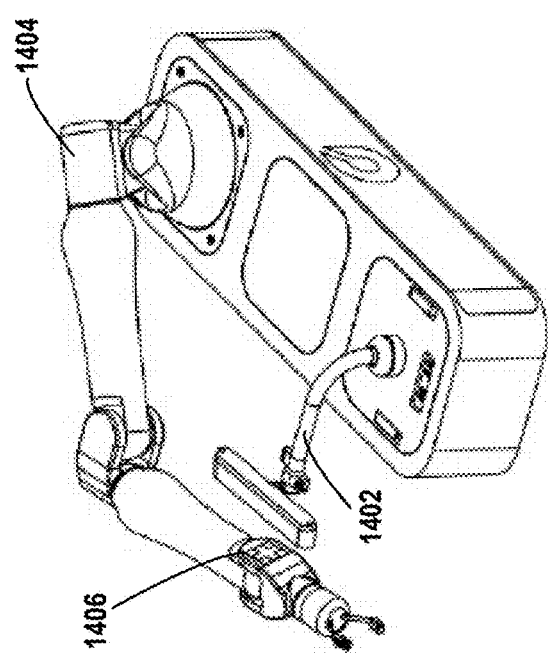

FIGS. 14A-14B illustrate an example second calibration to achieve a high accuracy rigid transformation between a camera peripheral 1402 and a robot arm peripheral 1404. As shown in FIG. 14A, the robot arm 1404 moves such that a visual fiducial 1406 on the robot arm 1404 is in the field of view of the camera 1402. An example image that the camera 1402 would capture is illustrated in FIG. 14B. The robot arm 1404 would move to multiple positions and orientations within the field of view of the camera 1402. The second calibration would then include solving an optimization problem to minimize the error between the estimated pose of the visual fiducials from the camera image and the pose of the visual fiducials based on the configuration of the robot arm 1404. The initial estimate of the transformation between the camera 1402 and the robot arm 1404 may be used to automatically generate the motions of the robot arm 1404. Further, this procedure may also be used to simultaneously calibrate the intrinsic parameters of the camera 1402, such as the focal length and field of view of the camera 1402, as examples. In another example, this procedure may be performed without the use of visual fiducials by solving an optimization problem to reduce the error between the actual camera image and a synthetic image generate by projecting the robot arm in the camera's view. Other secondary calibration procedures between two attached peripherals are possible as well.

Within some examples herein, operations may be described as methods for performing functions, and methods may be embodied on a computer program product (e.g., a tangible computer readable storage medium or non-transitory computer readable medium) that includes instructions executable to perform the functions.

Figure 15:
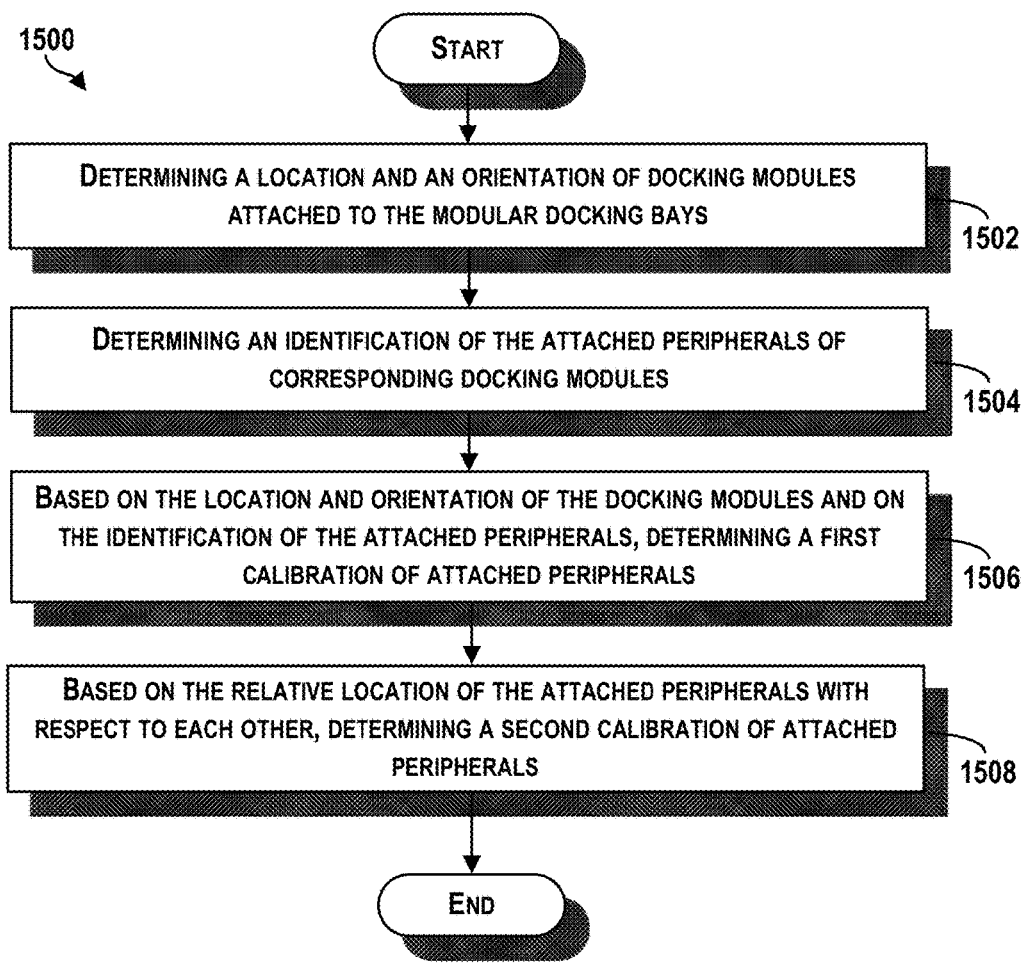
FIG. 15 is a flowchart illustrating an example method.

FIG. 15 is a flowchart illustrating an example method 1500 for operating a workcell. At block 1502, the method 1500 includes determining a location and an orientation of docking modules attached to the one or more modular docking bays. At block 1504, the method 1500 includes determining an identification of the attached peripherals of the corresponding one or more docking modules. At block 1506, the method 1500 includes based on the location and orientation of the docking modules and on the identification of the attached peripherals, determining a first calibration of attached peripherals. At block 1508, the method 1500 includes based on the relative location of the attached peripherals with respect to each other, determining a second calibration of attached peripherals.

Figure 16:
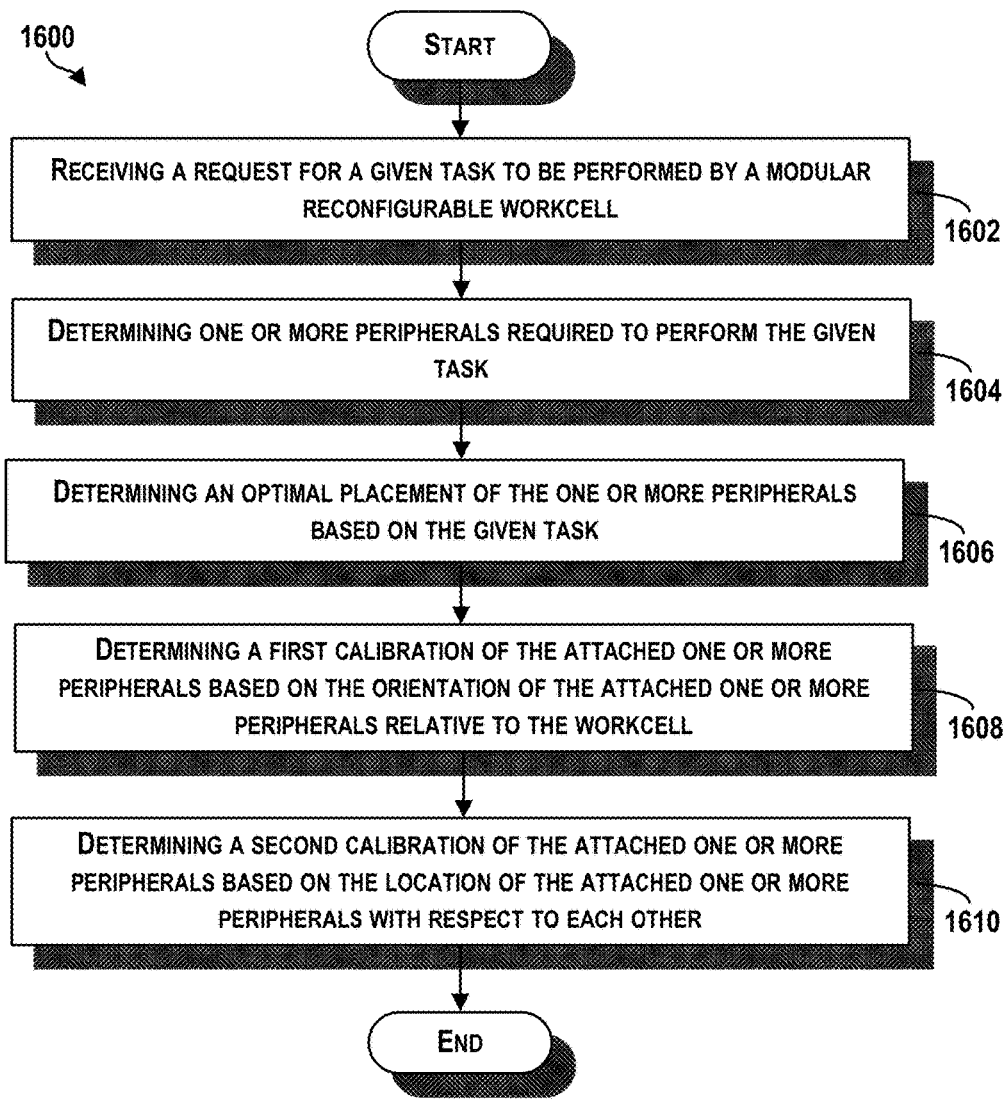
FIG. 16 is a flowchart illustrating another example method.

FIG. 16 is a flowchart illustrating an example method 1600 for configuring a workcell to perform a given task. Method 1600 may be performed by a computing device positioned inside an enclosure of the workcell. In another example, method 1600 may be performed by a computing device in wired or wireless communication with the computing device. Further, the given computing device may provide a wired or wireless client interface that enables a user to provide input to the workcell and visualize the workcell from a tablet, mobile phone, or other such device.

Referring to FIG. 16, at block 1602, the method 1600 includes receiving a request for a given task to be performed by a modular reconfigurable workcell. In on example, the task may be chose from a list of tasks capable of being performed by the workcell. Further, a given task may be broken down into several subtasks that are used to complete the given task. At block 1604, the method 1604 includes determining one or more peripherals required to perform the given task. The computing device may store a list of peripherals available to the workcell, along with specific subtasks that each peripheral is capable of performing. The computing device may compare the subtasks needed to complete the given task, and determine which peripherals are needed to complete the subtasks. Further, the computing device may optimize the peripherals from the set of one or more peripherals. For example, if two subtasks of the given task each need camera peripherals, a single camera peripheral would be sufficient. As another example, if one subtask of the given task requires a low resolution camera peripheral, and another subtask requires a high resolution camera peripheral, the computing device will optimize the system to determine only one high resolution camera peripheral is necessary to perform all of the subtasks of the given task.

At block 1606, the method 1600 includes determining an optimal placement of the one or more peripherals based on the given task. The computing device may also determine at this step whether the task is feasible. For example, the desired relative positioning of different peripherals may cause a conflict in geometry that cannot be resolved, or the task may need more docking stations than are available in the current workcell enclosure. In such a case, the computing device may display an error message with a corresponding explanation and visualization of the workcell.

If the computing device determines the task is feasible, the method 1600 continues at block 1608 with determining a first calibration of the attached one or more peripherals based on the orientation of the attached one or more peripherals relative to the workcell. At block 1608, the method 1600 includes determining a second calibration of the attached one or more peripherals based on the location of the attached one or more peripherals with respect to each other.

Figure 17B:
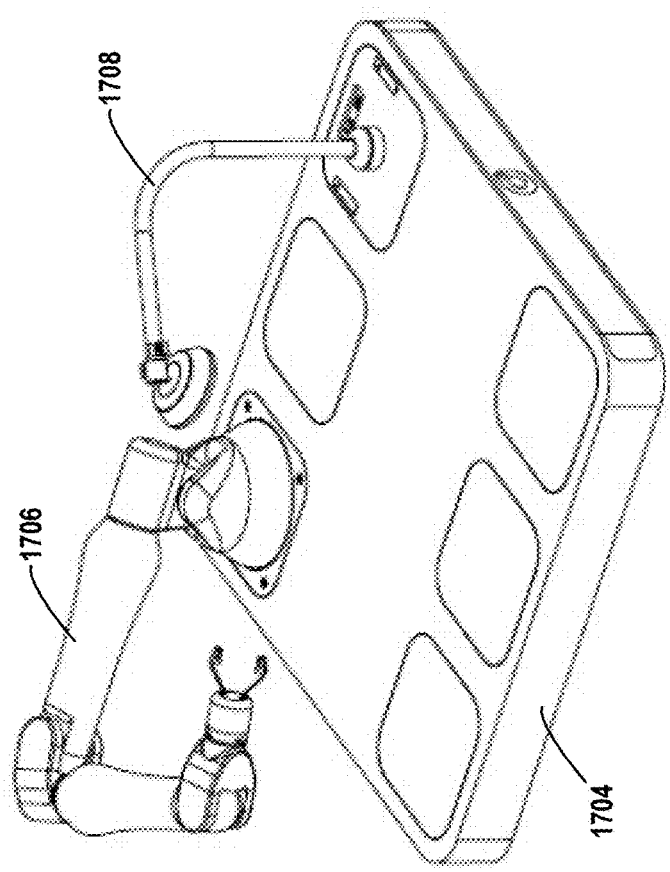
FIGS. 17A-17B illustrate an example task verification system for a workcell.
Figure 17A:
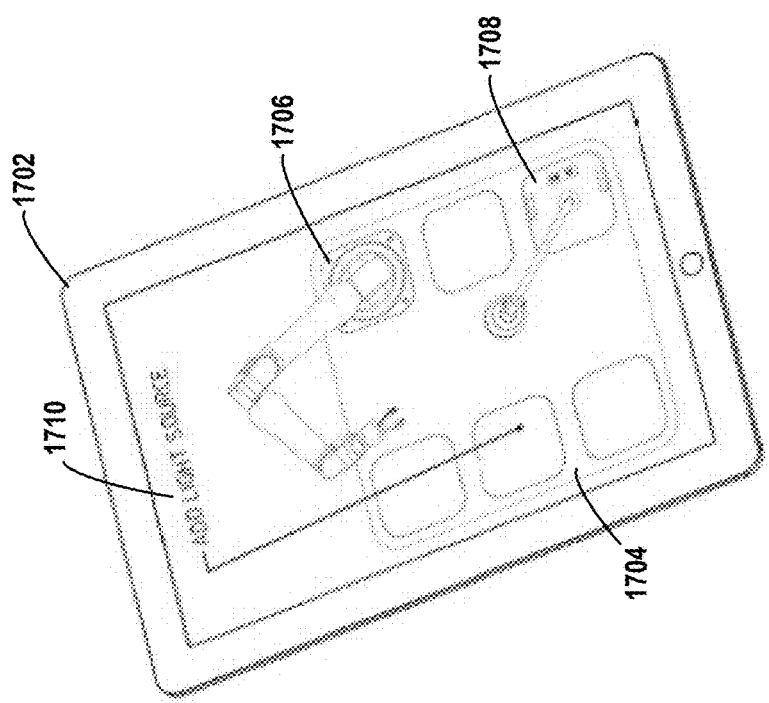

FIGS. 17A-17B illustrate an example task verification system for a workcell 1702. As discussed above in relation to FIG. 16, a computing device in communication with a workcell may be used to configure a workcell to execute a given task. Once the computing device receives the task, determines the peripherals needed to execute the task, and determines the task is feasible, the computing device may use the peripheral description files for each peripheral to generate a priority queue of installation steps that need to be performed to correctly set up the complete workcell. This prioritization may occur according to a knowledge database of precedence rules. The computing device may subsequently guide the user through all of the installation steps while simultaneously checking that the installation is proceeding correctly.

FIG. 17A illustrates an example visual representation of the attached one or more peripherals on an interface of a computing device 1702. The computing device 1702 may be a mobile phone, a tablet, or a personal computer as examples. FIG. 17B illustrates an actual workcell 1704 with a robot arm peripheral 1706 and a camera peripheral 1708. The configuration of the actual workcell is illustrated on the computing device 1702, as shown in FIG. 17A. As the user installs various components to the workcell for the given task, a dynamically updated animation may be visualized in the client user-interface in real time. This allows the user to quickly visually verify that the descriptive model of the configuration is consistent with the actual workcell setup. If a peripheral is added or removed from the workcell, the visualization on the computing device 1702 will reflect that change in real time.

Further, FIG. 17A illustrates an example where the task verification system determines that the current configuration of the workcell is insufficient to perform the desired task. In such a scenario, an error message 1710 may be displayed on the computing device 1702. In the example shown in FIG. 17A, the error message 1710 states that for the desired task to be performed, an additional light source is required. Using the workcell model visualization, the task verification system informs the user where the missing peripheral should be added for the workcell to be correctly configured to perform the desired task. Other example error messages are possible as well. For example, the computing device may determine that the camera resolution of an installed camera peripheral is not matched to the task. As another example, the computing device may determine that a given peripheral needs to be moved from the current docking station to a different docking station. This decision may be based on the workspace of a robot arm peripheral (e.g., to ensure that the robot arm peripheral has enough space to perform the desired task), the field of view of a camera peripheral and occlusions from other peripherals, or the relative positioning of a camera and light source. Other examples are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method operable by a computing device, the method comprising:
    determining a location and an orientation of a first docking module from among a plurality of modular docking bays on a surface of a workcell, wherein the first docking module provides an electrical and mechanical interface between a first peripheral and the workcell;
    determining an identification of an attached first peripheral;
    based on the determined location and orientation of the first docking module and on the identification of the attached first peripheral, determining a first calibration of the attached first peripheral;
    determining a location and an orientation of a second docking module from among the plurality of modular docking bays on the surface of the workcell, wherein the second docking module provides an electrical and mechanical interface between a second peripheral and the workcell;
    determining an identification of an attached second peripheral;
    based on the determined location and orientation of the second docking module and on the identification of the attached second peripheral, determining a first calibration of the attached second peripheral; and
    moving the attached first peripheral with respect to the attached second peripheral to thereby determine a second calibration of the attached first peripheral based on the location of the attached first peripheral with respect to the location of the attached second peripheral, wherein the second calibration indicates a distance between the attached first peripheral and the attached second peripheral and further indicates an orientation of the attached first peripheral with respect to the attached second peripheral, and wherein the second calibration enables the attached first peripheral and the attached second peripheral to interact with each other.

2. The method of claim 1, further comprising:
    determining a second calibration of the attached second peripheral based on the location of the attached second peripheral with respect to the location of the attached first peripheral.

3. The method of claim 1, wherein a given peripheral may include one or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

4. The method of claim 1, wherein the first modular docking bay and the second modular docking bay are identical.

5. The method of claim 1, wherein the second calibration of a respective attached peripheral comprises mating a three-dimensional feature of the attached first peripheral into a corresponding feature of the attached second peripheral.

6. The method of claim 1, wherein the first peripheral is a robot arm including a visual fiducial and the second peripheral is a camera, and wherein the second calibration of the attached first peripheral comprises moving the robot arm such that the visual fiducial is in a field of view of the camera.

7. The method of claim 1, further comprising:
    in response to the determined identification of a respective attached peripheral, receiving from the respective attached peripheral a peripheral description file of the respective attached peripheral.

8. The method of claim 7, wherein the peripheral description file includes one or more of geometric features, location of one or more relevant coordinate frames, kinematic properties, mass properties, range-of-motion constraints, calibration parameters, installation instructions, secure authentication keys, and diagnostic data.

9. The method of claim 7, wherein the peripheral description file is embedded in the respective attached peripheral, and the method further comprises:
    when the respective peripheral is attached to a respective modular docking bay, determining the identification of the respective attached peripheral by access to the peripheral description file.

10. The method of claim 7, wherein the peripheral description file is hosted on a server, and wherein the respective peripheral has a barcode or a RFID tag, and the method further comprises:
    when the respective peripheral is attached to a respective modular docking bay, obtaining the barcode or RFID tag to determine the identification of the respective attached peripheral and access to the peripheral description file.

11. A modular reconfigurable workcell comprising:
    one or more modular docking bays on a surface of the workcell that support attachment of one or more docking modules in a fixed geometric configuration, wherein respective modular docking bays include a plurality of electrical connections for a variety of power and communication busses of the one or more docking modules to be attached, and wherein the one or more docking modules provide an electrical and mechanical interface between a respective peripheral and the workcell;

an electrical subsystem for coupling the communication busses between the one or more modular docking bays and providing power circuitry to the one or more modular docking bays;

one or more structural features in the one or more modular docking bays to enable insertion of the one or more docking modules in the fixed geometric configuration such that an orientation of the one or more docking modules relative to the workcell is uniquely defined; and a processor for determining a first calibration of attached peripherals based on the orientation of corresponding one or more docking modules attached to the one or more modular docking bays and based on an identification of the attached peripherals of the corresponding one or more docking modules, wherein the processor further determines a second calibration of the attached peripherals based on a location of the one or more docking modules with respect to each other, wherein the second calibration is determined by moving an attached first peripheral with respect to an attached second peripheral, wherein the second calibration indicates a distance between the attached first peripheral and the attached second peripheral and further indicates an orientation of the attached first peripheral with respect to the attached second peripheral, and wherein the second calibration enables the attached first peripheral and the attached second peripheral to interact with each other.

12. The modular reconfigurable workcell of claim 11, wherein the second calibration of a respective attached peripheral comprises mating a three-dimensional feature of the attached first peripheral into a corresponding feature of the attached second peripheral.

13. The modular reconfigurable workcell of claim 11, wherein a first attached peripheral is a robot arm including a visual fiducial, wherein a second attached peripheral is a camera, and wherein the second calibration of the attached peripherals comprises moving the robot arm such that the visual fiducial is in a field of view of the camera.

14. The modular reconfigurable workcell of claim 11, wherein the one or more modular docking bays couple to the one or more docking modules through the electrical subsystem and via a printed circuit board (PCB) card edge connector or a wire harness.

15. The modular reconfigurable workcell of claim 11, wherein the one or more modular docking bays are arranged in an M×N array, and wherein the power circuitry and the processor are arranged between rows of the modular docking bays.

16. The modular reconfigurable workcell of claim 11, wherein the one or more modular docking bays are arranged in a 1×M array, and wherein the power circuitry and the processor are arranged underneath a row of the modular docking bays.

17. The modular reconfigurable workcell of claim 11, further comprising a power supply and a central backplane circuitry board that provides electrical interconnects between the one or more docking modules and the power supply and between the one or more docking modules and the processor.

18. A method operable by a computing device, the method comprising:

receiving a request for a given task to be performed by a modular reconfigurable workcell;

determining one or more peripherals required to perform the given task;

determining an optimal placement of the one or more peripherals based on the given task, wherein the one or more peripherals are coupled to the workcell in a fixed geometric configuration based on the determined optimal placement such that an orientation of the one or more peripherals relative to the workcell is uniquely defined;

determining a first calibration of the one or more peripherals based on the orientation of the one or more peripherals relative to the workcell; and moving a first peripheral of the one or more peripherals with respect to a second peripheral of the one or more peripherals to thereby determine a second calibration of the first peripheral of the one or more peripherals based on the optimal placement of the one or more peripherals with respect to each other, wherein the second calibration indicates a distances between the one or more peripherals and further indicates orientations of the one or more peripherals with respect to each other, and wherein the second calibration enables the attached one or more peripherals to interact with each other.

19. The method of claim 18, wherein a given peripheral may include one or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

20. The method of claim 18, further comprising:

providing for display a visual representation of the attached one or more peripherals on an interface of a computing device.

* * * * *